(12) United States Patent
Kaji et al.

(10) Patent No.: US 12,466,387 B2
(45) Date of Patent: Nov. 11, 2025

(54) VEHICLE CONTROL DEVICE

(71) Applicant: TOYOTA JIDOSHA KABUSHIKI KAISHA, Toyota (JP)

(72) Inventors: Fumiya Kaji, Numazu (JP); Michio Yoshida, Shizuoka-ken (JP); Tomoaki Yanagida, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 328 days.

(21) Appl. No.: 18/225,752

(22) Filed: Jul. 25, 2023

(65) Prior Publication Data

US 2024/0092342 A1    Mar. 21, 2024

(30) Foreign Application Priority Data

Sep. 16, 2022   (JP) .................................. 2022-148579

(51) Int. Cl.
| | |
|---|---|
| B60W 20/19 | (2016.01) |
| B60K 6/442 | (2007.10) |
| B60W 10/06 | (2006.01) |
| B60W 10/08 | (2006.01) |
| B60W 10/26 | (2006.01) |
| B60W 30/182 | (2020.01) |

(52) U.S. Cl.
CPC ............ *B60W 20/19* (2016.01); *B60K 6/442* (2013.01); *B60W 10/06* (2013.01); *B60W 10/08* (2013.01); *B60W 10/26* (2013.01); *B60W 30/182* (2013.01); *B60L 2220/42* (2013.01); *B60L 2260/00* (2013.01); *B60Y 2200/92* (2013.01); *B60Y 2300/60* (2013.01)

(58) Field of Classification Search
CPC ...... B60W 10/02; B60W 10/06; B60W 10/08; B60W 10/119; B60W 20/19; B60W 20/20; B60W 20/40; B60K 6/442; B60K 6/48; B60K 6/485
See application file for complete search history.

(56) References Cited

U.S. PATENT DOCUMENTS

| | | | | |
|---|---|---|---|---|
| 9,221,327 | B2 * | 12/2015 | Ono ........................ | F16H 3/728 |
| 9,545,917 | B2 * | 1/2017 | Maruyama ............ | B60W 10/18 |
| 9,562,481 | B2 * | 2/2017 | Matsubara ............. | B60K 6/365 |
| 9,663,094 | B2 * | 5/2017 | Oshiumi ................ | B60K 6/445 |

(Continued)

FOREIGN PATENT DOCUMENTS

| | | |
|---|---|---|
| JP | 2013-241100 A | 12/2013 |
| JP | 2016-007988 A | 1/2016 |
| JP | 2021-109473 A | 8/2021 |

*Primary Examiner* — Jeffrey J Restifo
(74) *Attorney, Agent, or Firm* — Sughrue Mion, PLLC

(57) ABSTRACT

A vehicle control device mounted on a vehicle includes a first traveling mode being driven by the torque output from a first rotary electric machine, and a second traveling mode being driven by the engine torque output from an engine and the torque output from the first rotary electric machine, wherein a section 1 for cranking the engine by the output of the second rotary electric machine and a section 2 for assisting the driving force of the engine by the output of the first rotary electric machine are provided during a period from the first traveling mode to the engagement of the clutch at the time of starting the engine to the second traveling mode, and the torque increase of the first rotary electric machine is limited in the section 1.

4 Claims, 14 Drawing Sheets

(56) References Cited

U.S. PATENT DOCUMENTS

| | | | | |
|---|---|---|---|---|
| 9,718,459 | B2* | 8/2017 | Imamura | B60W 10/08 |
| 9,758,161 | B2* | 9/2017 | Hata | B60K 6/445 |
| 9,849,874 | B2* | 12/2017 | Hata | B60K 6/26 |
| 9,868,437 | B2* | 1/2018 | Iwata | F02B 63/04 |
| 9,944,275 | B2* | 4/2018 | Tabata | B60W 20/40 |
| 10,202,113 | B2* | 2/2019 | Hata | B60K 6/445 |
| 10,232,715 | B2* | 3/2019 | Kawashima | B60L 3/0069 |
| 10,322,715 | B2* | 6/2019 | Tsuda | F02N 11/0803 |
| 10,710,447 | B2* | 7/2020 | Kasahara | B60K 6/445 |
| 10,982,726 | B2* | 4/2021 | Watanabe | F16D 48/06 |
| 11,027,731 | B2* | 6/2021 | Cho | B60K 6/442 |
| 11,225,244 | B2* | 1/2022 | Meyer | B60K 6/442 |
| 11,247,657 | B2* | 2/2022 | Suzuki | B60K 6/383 |
| 11,453,384 | B2* | 9/2022 | Imamura | B60K 6/365 |
| 11,719,211 | B2* | 8/2023 | Ogata | F16F 15/1217 |
| | | | | 123/179.3 |
| 11,787,392 | B2* | 10/2023 | Ebuchi | B60W 30/19 |
| | | | | 701/22 |
| 12,286,094 | B2* | 4/2025 | Pi | B60K 6/442 |
| 2015/0057863 | A1* | 2/2015 | Kuwamoto | B60W 20/40 |
| | | | | 180/65.265 |
| 2016/0325735 | A1* | 11/2016 | Kato | B60W 10/06 |
| 2017/0259809 | A1* | 9/2017 | Sakamoto | B60W 40/105 |
| 2018/0201253 | A1* | 7/2018 | Fujita | B60K 6/445 |
| 2018/0281779 | A1* | 10/2018 | Itoyama | B60W 30/20 |
| 2020/0207327 | A1* | 7/2020 | Imamura | B60W 10/115 |
| 2022/0055610 | A1* | 2/2022 | Takada | B60W 20/11 |
| 2024/0092342 | A1* | 3/2024 | Kaji | B60K 6/485 |

* cited by examiner

VEHICLE CONTROL DEVICE

CROSS-REFERENCE TO RELATED APPLICATION

This application claims priority to Japanese Patent Application No. 2022-148579 filed on Sep. 16, 2022 incorporated herein by reference in its entirety.

BACKGROUND

1. Technical Field

The present disclosure relates to a vehicle control device.

2. Description of Related Art

Japanese Unexamined Patent Application Publication No. 2013-241100 (JP 2013-241100 A) discloses a hybrid electric vehicle that assists the response delay of the engine start with a first rotary electric machine, which is a power source for vehicle traveling, in addition to a starter motor, when shifting from the electric traveling mode to the hybrid traveling mode. Japanese Unexamined Patent Application Publication No. 2021-109473 (JP 2021-109473 A) discloses a technique in which the torque of the second rotary electric machine, which is a power source for vehicle traveling, is increased while starting the engine with the first rotary electric machine, and after the engine start, the torque of the second rotary electric machine is further increased by performing power generation by the first rotary electric machine.

SUMMARY

In the hybrid electric vehicle disclosed in JP 2013-241100 A, most of the battery output is consumed by the starter motor for starting the engine, the output of the first rotary electric machine becomes equal to or less than the steady output of the battery output resulting in small driving force compensation, and therefore the assisting effect of the response delay of the driving force is small. Further, in the technique disclosed in JP 2021-109473 A, since the torque of the second rotary electric machine is increased during the engine start, the engine start may be delayed depending on the state of the battery, and the responsiveness of the driving force may be lowered.

The present disclosure has been made in view of the above problems, and an object thereof is to provide a vehicle control device capable of improving responsiveness of a driving force.

In order to solve the above-described problems and achieve the object, a vehicle control device according to the present disclosure is a vehicle control device mounted on a vehicle including: an engine; a clutch provided on a power transmission path between the engine and a drive wheel; a first rotary electric machine connected to the drive wheel; a second rotary electric machine connected to the engine; and a power storage device for supplying electric power to the first rotary electric machine and the second rotary electric machine. The vehicle further includes a first traveling mode in which the vehicle travels using torque output from the first rotary electric machine driven by electric power from the power storage device, in a state in which the clutch is released and the engine is stopped, and a second traveling mode in which the engine is operated with the clutch engaged and the vehicle travels using torque output from the engine and the torque output from the first rotary electric machine driven by electric power from the power storage device. A section 1 and a section 2 are included in a period until a clutch engagement at a time of starting the engine when shifting from the first traveling mode to the second traveling mode. The section 1 is a section for cranking the engine by an output of the second rotary electric machine, and the section 2 is a section after the section 1 and a section for assisting a driving force of the engine by an output of the first rotary electric machine. The vehicle control device performs control for limiting an increase in the torque of the first rotary electric machine in the section 1.

Thus, the driving force compensation can be performed by the output of the first rotary electric machine which is equal to or higher than the steady output of the power storage device before the clutch is engaged, and the responsiveness of the driving force can be improved.

In addition, in the above, the vehicle control device may perform control in which an output upper limit of the first rotary electric machine is determined to be zero in a first half portion of the section 1 and in which the output upper limit of the first rotary electric machine is determined to be a value obtained by subtracting an output of the second rotary electric machine from a steady output of the power storage device in a second half portion of the section 1, when an elapsed time from a determination of a shift from the first traveling mode to the second traveling mode is equal to or less than a predetermined time set in advance.

As a result, the driving force compensation amount by the first rotary electric machine can be improved.

In addition, in the above, the vehicle control device may perform control such that a total of a required output of the first rotary electric machine and a required output of the second rotary electric machine becomes a maximum output of the power storage device in the section 1, when an accelerator operation amount is smaller than a predetermined accelerator operation amount set in advance, when a vehicle speed is lower than a predetermined vehicle speed set in advance, or when a synchronous rotation speed at a time of clutch connection is lower than a predetermined synchronous rotation speed set in advance.

Thus, the driving force compensation can be performed by the first rotary electric machine from the start of the mode shift from the first traveling mode to the second traveling mode.

In addition, in the above, the section 1 may be a period until an engine speed becomes equal to or higher than a predetermined speed.

As a result, the engine start failure can be suppressed by performing the cranking with the second rotary electric machine until the complete combustion of the engine.

The vehicle control device according to the present disclosure has an effect of enabling the driving force compensation to be performed by the output of the first rotary electric machine which is equal to or higher than the steady output of the power storage device before the clutch is engaged, and therefore can improve the responsiveness of the driving force.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment 1

Hereinafter, a first embodiment of a vehicle equipped with the vehicle control device according to the present disclosure will be described. This embodiment is not intended to limit the present disclosure.

Figure 1:
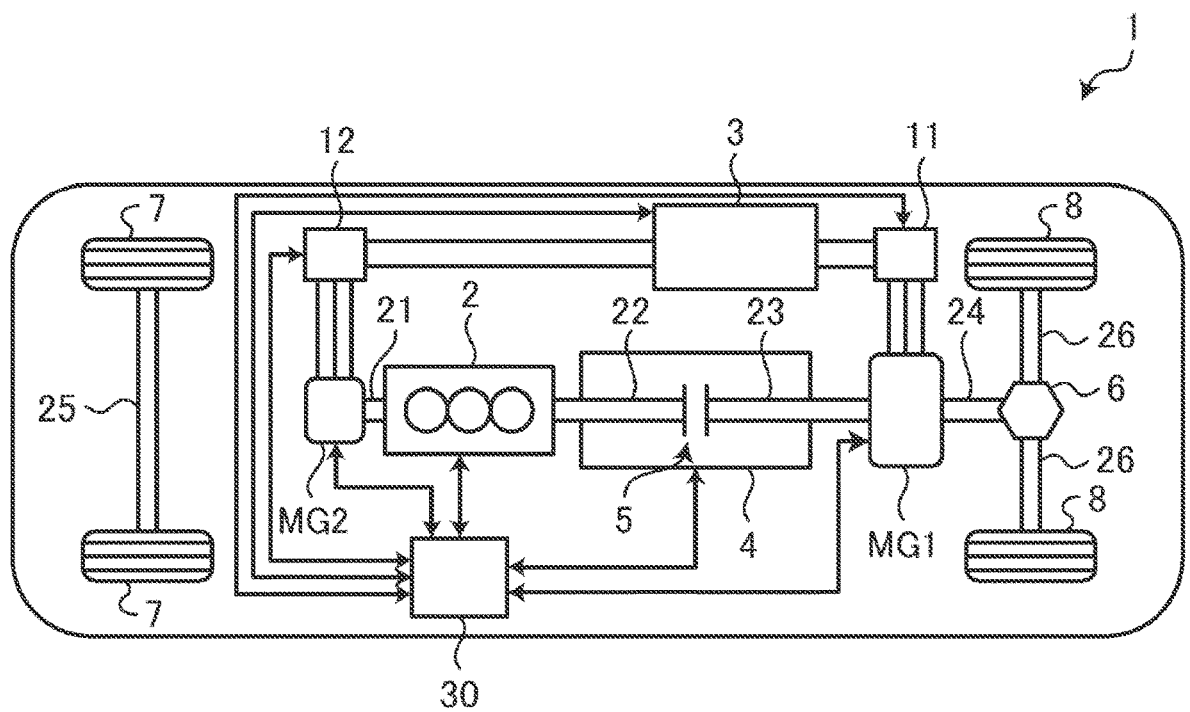
FIG. 1 is a diagram illustrating a schematic configuration of a vehicle according to a first embodiment.

FIG. 1 is a diagram illustrating a schematic configuration of a vehicle 1 according to a first embodiment. As illustrated in FIG. 1, the vehicle 1 according to the first embodiment includes an engine 2, a battery 3, a transmission 4, a clutch 5, a differential gear 6, a front wheel 7, a rear wheel 8, a first Power Control Unit (PCU) 11, a second PCU 12, a plurality of rotation shafts 21, 22, 23, and 24, a front drive shaft 25, a rear drive shaft 26, a control device 30, a first rotary electric machine MG1, a second rotary electric machine MG2, and the like.

A transmission 4 is disposed on an output side of the engine 2, and a crankshaft, which is a rotation shaft of the engine 2, is connected to a rotation shaft 22 of the transmission 4. The engine 2 is, for example, an internal combustion engine such as a gasoline engine or a diesel engine, and outputs a torque corresponding to a required driving force by controlling a throttle opening degree and a fuel injection amount in accordance with a required driving force such as a depression amount (accelerator operation amount) of an accelerator pedal by a driver.

The transmission 4 is disposed on the same axial line as the engine 2, and transmits torque between the engine 2 and the first rotary electric machine MG16 and the rear wheel 8, which is a drive wheel. The transmission 4 is a mechanism capable of appropriately changing the ratio of the input rotational speed to the output rotational speed, and can be constituted by a stepped transmission, a continuously variable transmission capable of continuously changing the gear ratio, or the like. The transmission 4 comprises a clutch 5 which can be engaged to transmit torque and released to interrupt the transmission of torque and set a neutral state.

Figure 2:
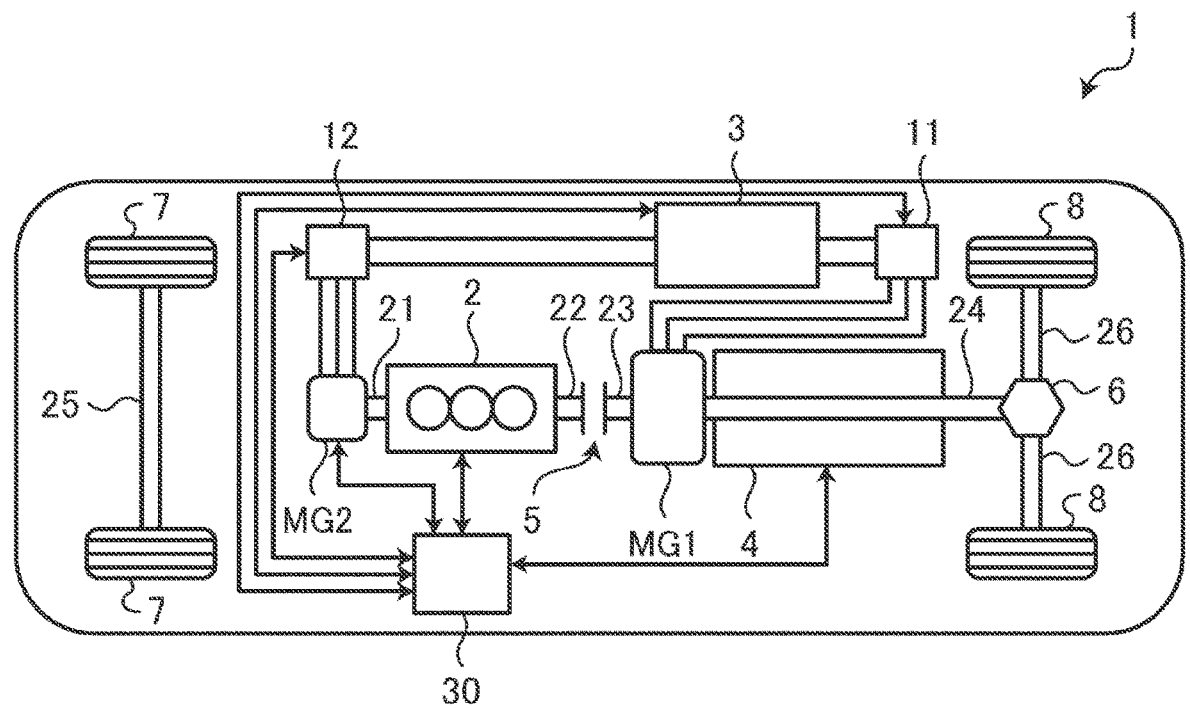
FIG. 2 is a diagram illustrating another example of the position of the clutch in the schematic configuration of the vehicle according to the first embodiment.
Figure 3:
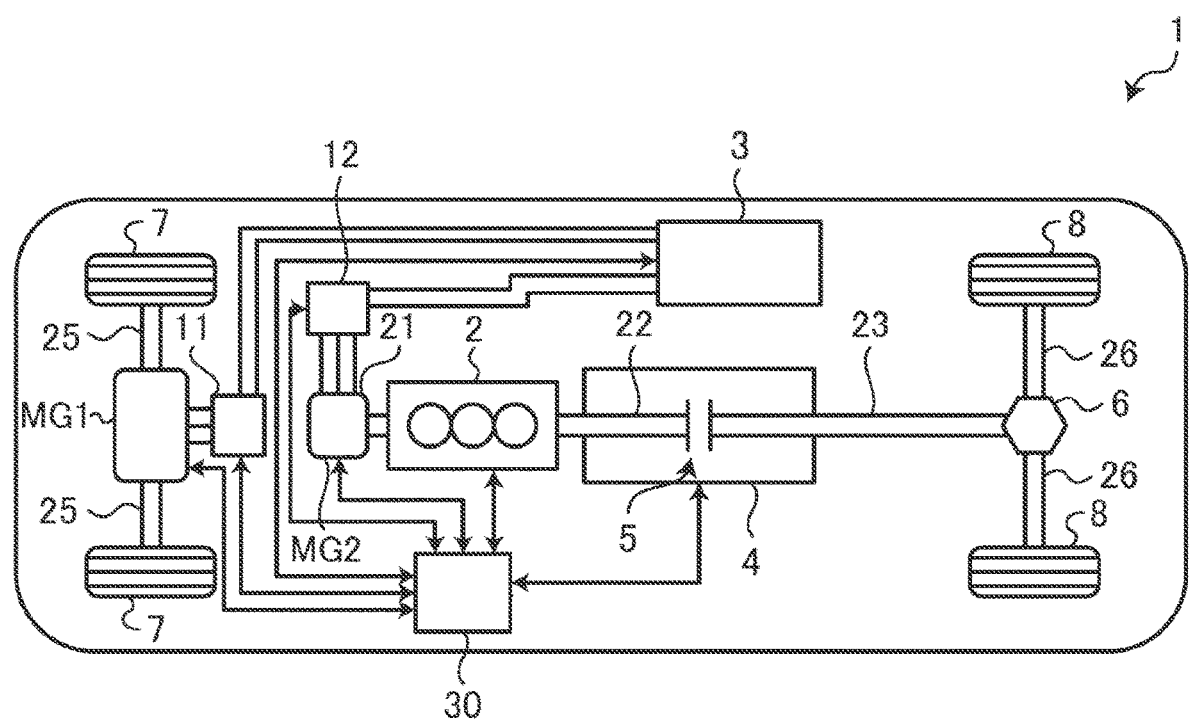
FIG. 3 is a diagram illustrating another example of the position of the first rotary electric machine in the schematic configuration of the vehicle according to the first embodiment.

The clutch 5 is connected to a rotation shaft 22 connected to the crankshaft of the engine 2 and a rotation shaft 23 connected to the rotor shaft of the first rotary electric machine MG1, and selectively transmits and disconnects power between the engine 2 and the first rotary electric machine MG1 (rear wheel 8). Further, in the vehicle 1 according to the embodiment, the clutch 5 is not limited to the configuration incorporated in the transmission 4, and for example, as shown in FIG. 2, the first rotary electric machine MG1 may be disposed between the engine 2 and the transmission 4, and the clutch 5 may be provided between the engine 2 and the first rotary electric machine MG1. In any case, by releasing the clutch 5, the engine 2 is disconnected from the drive system of the vehicle 1. Further, by engaging the clutch 5, the engine 2 is connected to the drive system of the vehicle 1. The left and right front wheels 7 are driven wheels connected to the front drive shaft 25 and driven by the travel of the vehicle 1 by the rotational driving force of the rear wheels 8, which are drive wheels. In the vehicle 1 according to the first embodiment, as shown in FIG. 3, the first rotary electric machine MG1 may be connected to the left and right front wheels 7 via the left and right front drive shafts 25 so as to be able to transmit power as drive wheels.

The first rotary electric machine MG1 is connected to the left and right rear wheels 8 so as to be capable of transmitting power. The first rotary electric machine MG1 has a function as a prime mover that is driven by being supplied with electric power and outputs torque, and a function as a generator that generates electricity by being driven by receiving torque from the outside. That is, the first rotary electric machine MG1 is a motor-generator, and is constituted by, for example, a permanent magnet-type synchronous motor, an induction motor, or the like. A battery 3 is connected to the first rotary electric machine MG1 via a first PCU 11, and a torque (MG1 torque) can be outputted by driving the first rotary electric machine MG1 by electric power from the battery 3 which is a power storage device. The first rotary electric machine MG1 outputs a driving force according to a required driving force such as a depression amount (accelerator operation amount) of the accelerator pedal by the driver. Further, since the first rotary electric machine MG1 is connected to the rear wheel 8 so as to be capable of transmitting power, the first rotary electric machine MG1 can be driven as a generator by the torque transmitted from the rear wheel 8, and the electric power generated thereby can be stored in the battery 3.

A rotation shaft 24 as a rear propeller shaft is connected to the rotor shaft of the first rotary electric machine MG1. The rotation shaft 24 extends rearward from the first rotary electric machine MG1 in the front-rear direction of the vehicle 1. The rotation shaft 24, the differential gear 6 is linked. Left and right rear wheels (drive wheels) 8 are connected to the differential gear 6 via left and right rear drive shafts 26.

The rotation shaft 21 of the second rotary electric machine MG2 is connected to the crankshaft of the engine 2. The rotation shaft 21 of the second rotary electric machine MG2 may be connected to the crankshaft of the engine 2 via gears or belts. The second rotary electric machine MG2 may be disposed between the engine 2 and the clutch 5. The second rotary electric machine MG2 is connected to the battery 3 via a second PCU 12, and the second rotary electric machine MG2 can be driven by electric power from the battery 3 to output torque (MG2 torque). The second rotary electric machine MG2 functions as a starter motor that cranks the engine 2 by the electric power of the battery 3.

In the vehicle 1 according to the embodiment, one of BEV mode which is the first traveling mode and HEV mode which is the second traveling mode can be set to travel. BEV mode is a running mode in which the vehicle 1 is driven by the torque outputted from the first rotary electric machine MG1 driven by the electric power from the battery 3 while the clutch 5 is released and the engine 2 is stopped. HEV mode is a running mode in which the engine 2 is operated with the clutch 5 engaged, and the vehicle 1 is driven by the engine torque output from the engine 2 and the torque output from the first rotary electric machine MG1 driven by the electric power from the battery 3.

The control device 30 is a vehicle control device, and controls the engine 2, the battery 3, the transmission 4, the clutch 5, the first PCU 11, the second PCU 12, the first rotary electric machine MG1, the second rotary electric machine MG2, and the like. In addition, various kinds of information necessary for the travel control are input to the control device 30. Examples of the information include an ignition signal from an ignition switch, a shift position from a shift position sensor that detects an operating position of a shift lever, an accelerator operation amount from an accelerator pedal position sensor that detects a depression amount of an accelerator pedal by a driver, a brake pedal position from a brake pedal position sensor that detects a depression amount of a brake pedal by a driver, an engine speed from an engine speed sensor, an MG1 speed from an MG1 speed sensor that detects a rotation speed of a first rotary electric machine MG1, an MG2 speed from an MG2 speed sensor that detects a rotation speed of a second rotary electric machine MG2, and a vehicle speed from a vehicle speed sensor.

Figure 4:
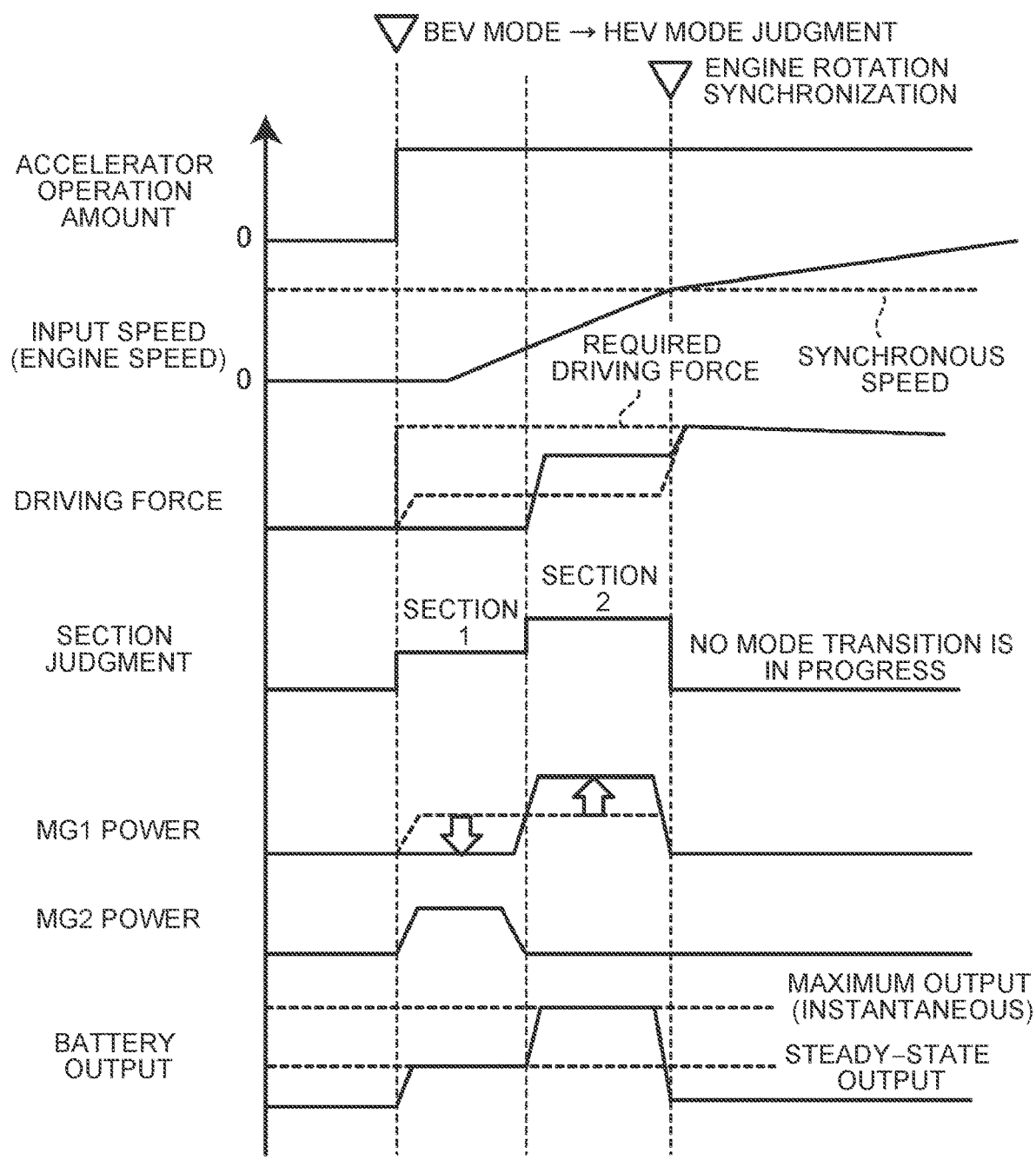
FIG. 4 is a diagram illustrating a timing chart when switching from BEV mode to HEV mode.

The vehicle 1 according to the first embodiment has a section 1 which is a section for cranking the engine 2 by the output of the second rotary electric machine MG2 and a section 2 which is a section after the section 1 and is a section for assisting the driving force of the engine 2 by the output of the first rotary electric machine MG1 in a period from BEV mode to the engagement of the clutch 5 at the time of engine start shifting to HEV mode when switching to BEV mode. Further, in the vehicle 1 according to the first embodiment, the control device 30 can perform the control of limiting the torque-increase of the first rotary electric machine MG1 in the section 1 at the time of mode-transition. In other words, in the vehicle 1 according to the first embodiment, during the mode transition from BEV mode to HEV mode, the section 1 is set during the engine start in which the power demand is essential to the second rotary electric machine MG2 for cranking, and the section 2 is set until the mode transition from the engine start completion determination to HEV mode is completed. In the vehicle 1 according to the first embodiment, the control device 30 can perform control for switching the required power to the first rotary electric machine MG1 between the section 1 and the section 2. Note that the engine start completion determination (end determination of section 1) can be determined to be the engine start completion, for example, when the engine speed is equal to or higher than a predetermined value (engine speed≥predetermined value). As a result, the engine starting failures can be suppressed by performing the cranking in the second rotary electric machine MG2 until the engine complete explosion. Then, for example, in the timing chart shown in FIG. 4 when switching from BEV mode to HEV mode, during the mode transition from BEV mode to HEV mode, the output upper limit of the first rotary electric machine MG1 is set to 0 in the section 1, and the output upper limit of the first rotary electric machine MG1 is set to the battery maximum output in the section 2.

Figure 5:
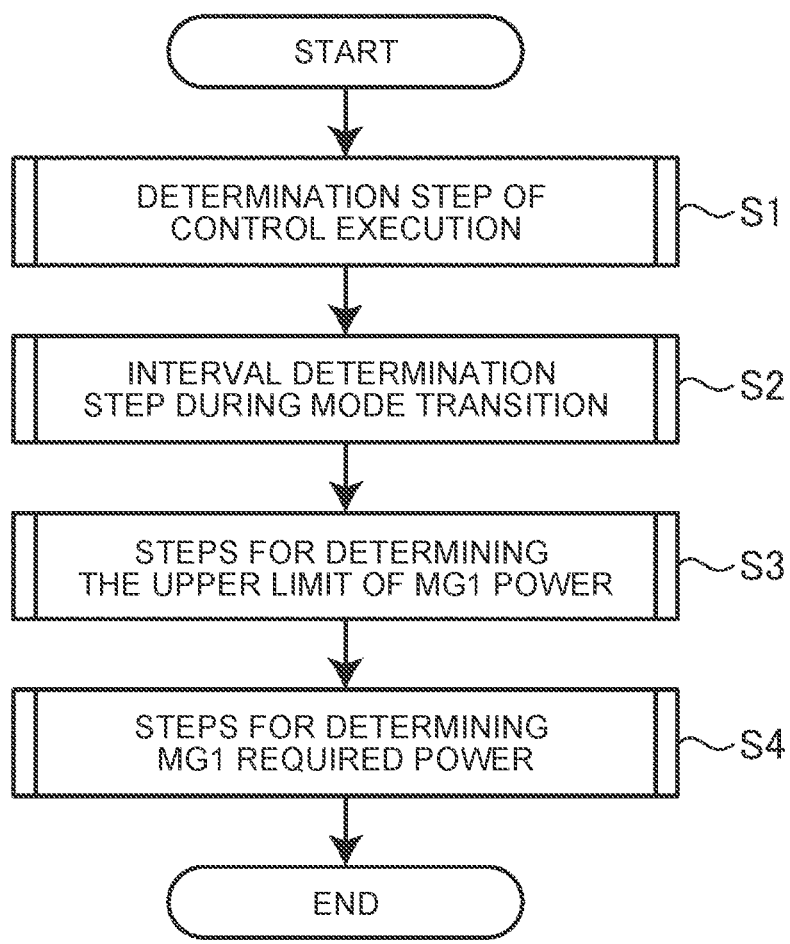
FIG. 5 is a flowchart illustrating an outline of request output determination control of the first rotary electric machine performed by the control device of the vehicle according to the first embodiment.

FIG. 5 is a flow chart illustrating an outline of the required-power determination control of the first rotary electric machine MG1 performed by the control device 30 of the vehicle 1 according to the first embodiment. In the following explanation, the required-power determination control of the first rotary electric machine MG1 performed by the control device 30, which is performed in a series of flows as illustrated in FIG. 5, is also referred to as "this control".

First, the control device 30 executes determination steps of control execution (S1). In the determination step of the control execution, whether or not to execute the required power determination control of the first rotary electric machine MG1 is determined based on the accelerator operation amount, the vehicle speed, the synchronous rotational speed, and the like. Next, the control device 30 executes the section determination step during the mode-shifting (S2). In the section determination step during the mode transition, the present section during the mode transition from BEV mode to HEV mode is determined by the engine speed, the synchronous speed, the timer, and the like. Next, the control device 30 performs MG1 power upper limit determination steps (S3). In the step of determining MG1 output upper limit, the output upper limit of the first rotary electric machine MG1 is determined according to the section during the mode transition from BEV mode to HEV mode. The control device 30 then performs MG1 request-output determination steps (S4). In the step of determining MG1 required output, the required output of the first rotary electric machine MG1 is determined from the output upper limit of the first rotary electric machine MG1 and the required driving force.

Figure 6:
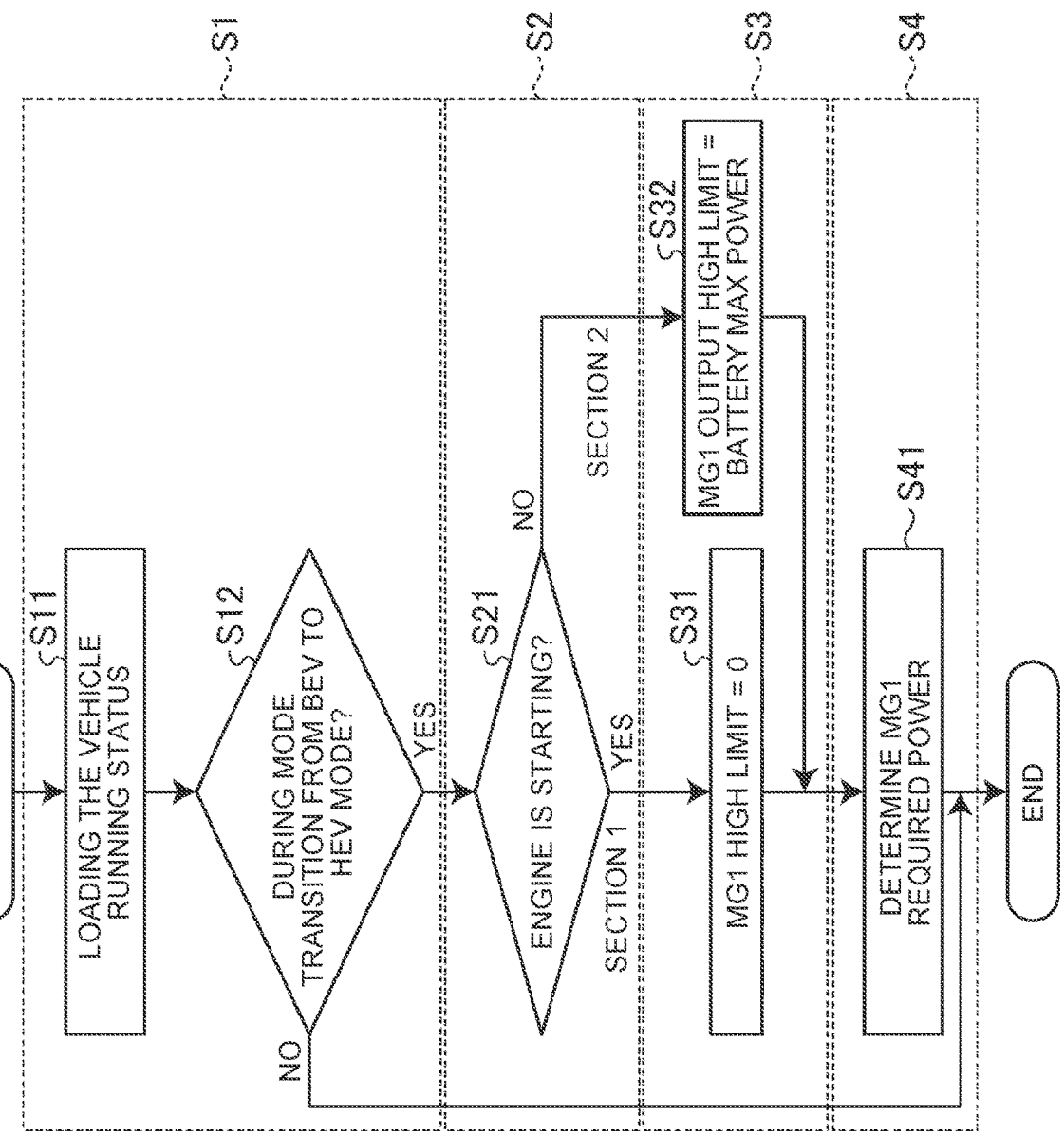
FIG. 6 is a flowchart illustrating an example of request output determination control of the first rotary electric machine performed by the control device of the vehicle according to the first embodiment.

FIG. 6 is a flow chart illustrating an exemplary required-power determination control of the first rotary electric machine MG1 performed by the control device 30 of the vehicle 1 according to the first embodiment. In FIG. 6, S11 process and S12 process are included in the control execution determination step (S1). Further, in FIG. 6, S21 process is included in the section determination step (S2) during the mode-shifting. In addition, in FIG. 6, S31 process and S32 process are included in MG1 power upper limit determination step (S3). In addition, in FIG. 6, S41 process is included in MG1 request-output determination step (S4).

First, the control device 30 reads the traveling condition of the vehicle (S11). Next, the control device 30 determines whether or not the mode transition from BEV mode to HEV mode is in progress (S12). When the control device 30 determines that the mode transition from BEV mode to HEV mode is not being performed (No in S12), the control device 30 terminates the required-output determination control of the series of first rotary electric machine MG1. On the other hand, when the control device 30 determines that the mode transition from BEV mode to HEV mode is being performed (Yes in S12), the control device 30 determines whether or not the engine is being started (S21). When the control device 30 determines that the engine is being started (Yes in S2), it determines that the section during the mode-shifting is the section 1, and determines the output upper limit of the first rotary electric machine MG1 to be 0 (S31). Next, the control device 30 determines the required output of the first rotary electric machine MG1 from the determined output upper limit of the first rotary electric machine MG1 and the required driving force (S41). Thereafter, the control device 30 ends the series of required-output determination control of the first rotary electric machine MG1.

Further, in S21, when the control device 30 determines that the engine is not being started (No in S21), it determines that the section during the mode-shifting is the section 2, and determines the output upper limit of the first rotary electric machine MG1 to be the maximum output of the battery (S32). Next, the control device 30 determines the required output of the first rotary electric machine MG1 from the determined output upper limit of the first rotary electric machine MG1 and the required driving force (S41). Thereafter, the control device 30 ends the series of required-output determination control of the first rotary electric machine MG1.

In the vehicle 1 according to the first embodiment, the required power of the first rotary electric machine MG1 is switched according to the section (the section 1 and the section 2) during the mode transition from BEV mode to HEV mode. Thus, in the vehicle 1 according to the first embodiment, the first rotary electric machine MG1 can effectively compensate for the response delay of the driving force (acceleration) without increasing the battery capacity (increasing the cost).

Embodiment 2

Hereinafter, a second embodiment of the vehicle control device according to the present disclosure will be described. In the present embodiment, description similar to that of the first embodiment will be omitted as appropriate.

In the vehicle 1 according to the second embodiment, the present control is not performed at all times during the mode transition from BEV mode to HEV mode. That is, in the vehicle 1 according to the second embodiment, the present control is performed when the acceleration request from the driver is high. Then, when the conventional control is more favorable than the present control (for example, when the acceleration demand from the driver is not high), the conventional control is performed to compensate the driving force in the first rotary electric machine MG1 from the beginning of the mode-transition. As the conventional control, for example, in the section 1 during the mode transition, control is performed so that the sum of the required output of the first rotary electric machine MG1 and the required output of the second rotary electric machine MG2 becomes the maximum battery output. Then, in the section 2 during the mode-shifting, the required output of the second rotary electric machine MG2 is set to 0, and the required output of the first rotary electric machine MG1 performs control to maintain the required output of the section 1. That is, in the conventional control, during the mode transition from BEV mode to HEV mode, the required power of the first rotary electric machine MG1 is set to be the same without being changed between the section 1 and the section 2.

Figure 7:
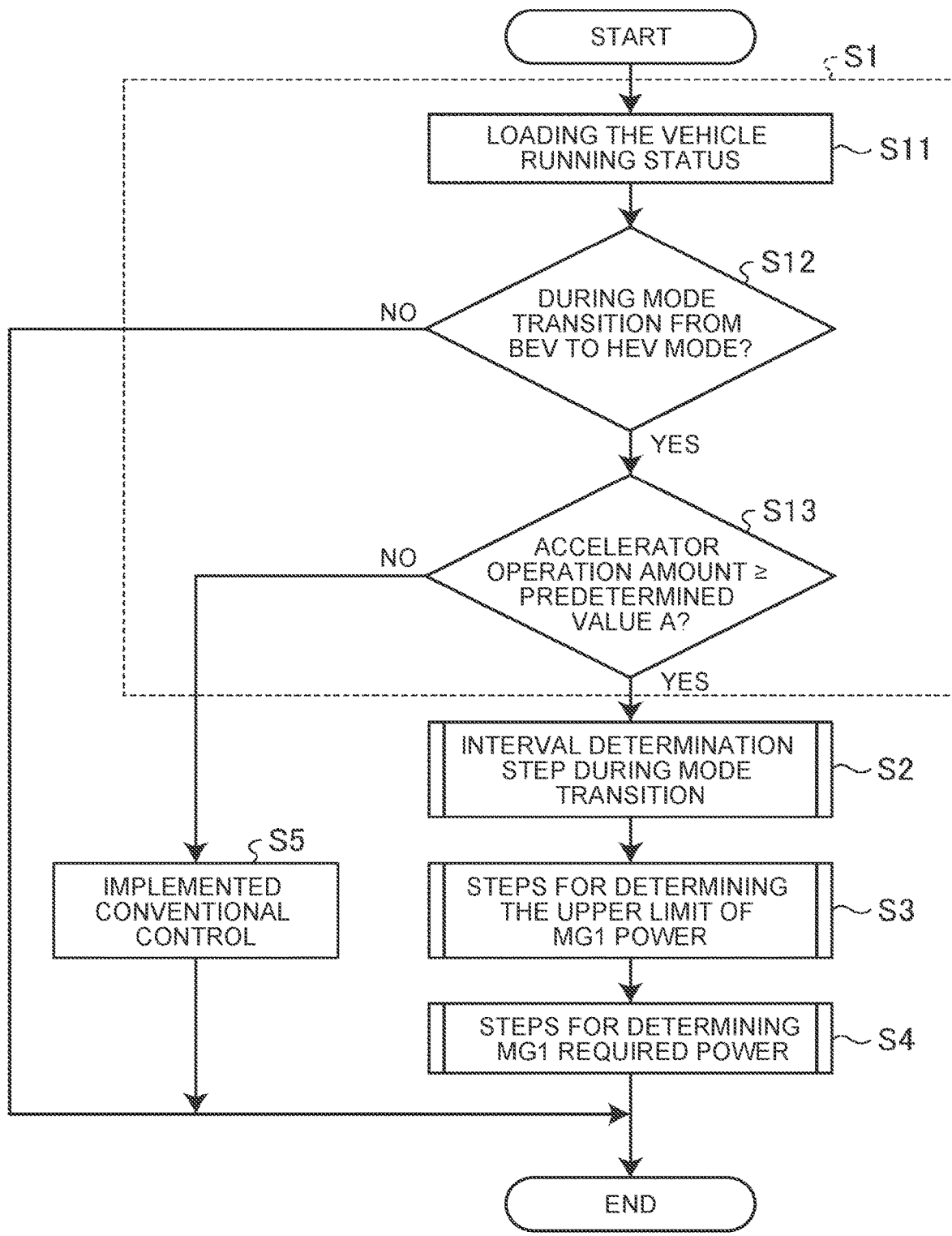
FIG. 7 is a flowchart illustrating an example of request output determination control of the first rotary electric machine performed by the control device in the vehicle according to the second embodiment.

FIG. 7 is a flow chart illustrating an exemplary required-power determination control of the first rotary electric machine MG1 performed by the control device 30 in the vehicle 1 according to the second embodiment. In FIG. 7, S11 process, S12 process, and S13 process are included in the control execution determination step (S1).

First, the control device 30 reads the traveling condition of the vehicle (S11). Next, the control device 30 determines whether or not the mode transition from BEV mode to HEV mode is in progress (S12). When the control device 30 determines that the mode transition from BEV mode to HEV mode is not being performed (No in S12), the control device 30 ends the required-output determination control of the first rotary electric machine MG1. On the other hand, when the control device 30 determines that the mode transition from BEV mode to HEV mode is being performed (Yes in S12), the control device 30 determines whether or not the accelerator operation amount is equal to or greater than a predetermined value A (accelerator operation amount≥predetermined value A) (S13). The predetermined value A is, for example, a predetermined accelerator operation amount set in advance. When the control device 30 determines that the accelerator operation amount is equal to or greater than the predetermined value A (Yes in S13), the control device 30 performs the section determination step during the mode-shifting (S2). Thereafter, the control device 30 terminates the request output determination control of the series of first rotary electric machine MG1 by executing the determination step of MG1 output upper limit (S3) and the determination step of MG1 request output (S4).

When the control device 30 determines that the accelerator operation amount is less than the predetermined value A (accelerator operation amount<predetermined value A), the control device 30 performs the conventional control (S5). Thereafter, the control device 30 ends the series of required-output determination control of the first rotary electric machine MG1.

In the vehicle 1 according to the second embodiment, when the acceleration request from the driver is high, the present control can be performed in an area where the deviation between the required driving force and the driving force compensation in the first rotary electric machine MG1 is large in the conventional control.

Embodiment 3

A third embodiment of the vehicle control device according to the present disclosure will be described below. In the present embodiment, description similar to that of the first embodiment will be omitted as appropriate.

In the vehicle 1 according to the third embodiment, the present control is not always performed during the mode transition from BEV mode to HEV mode, but the present control is performed in an area where the acceleration demand from the driver is high and the driving force compensation of the first rotary electric machine MG1 is reduced in the conventional control, and the conventional control is performed depending on a condition in which the conventional control is more favorable than the present control.

Figure 8:
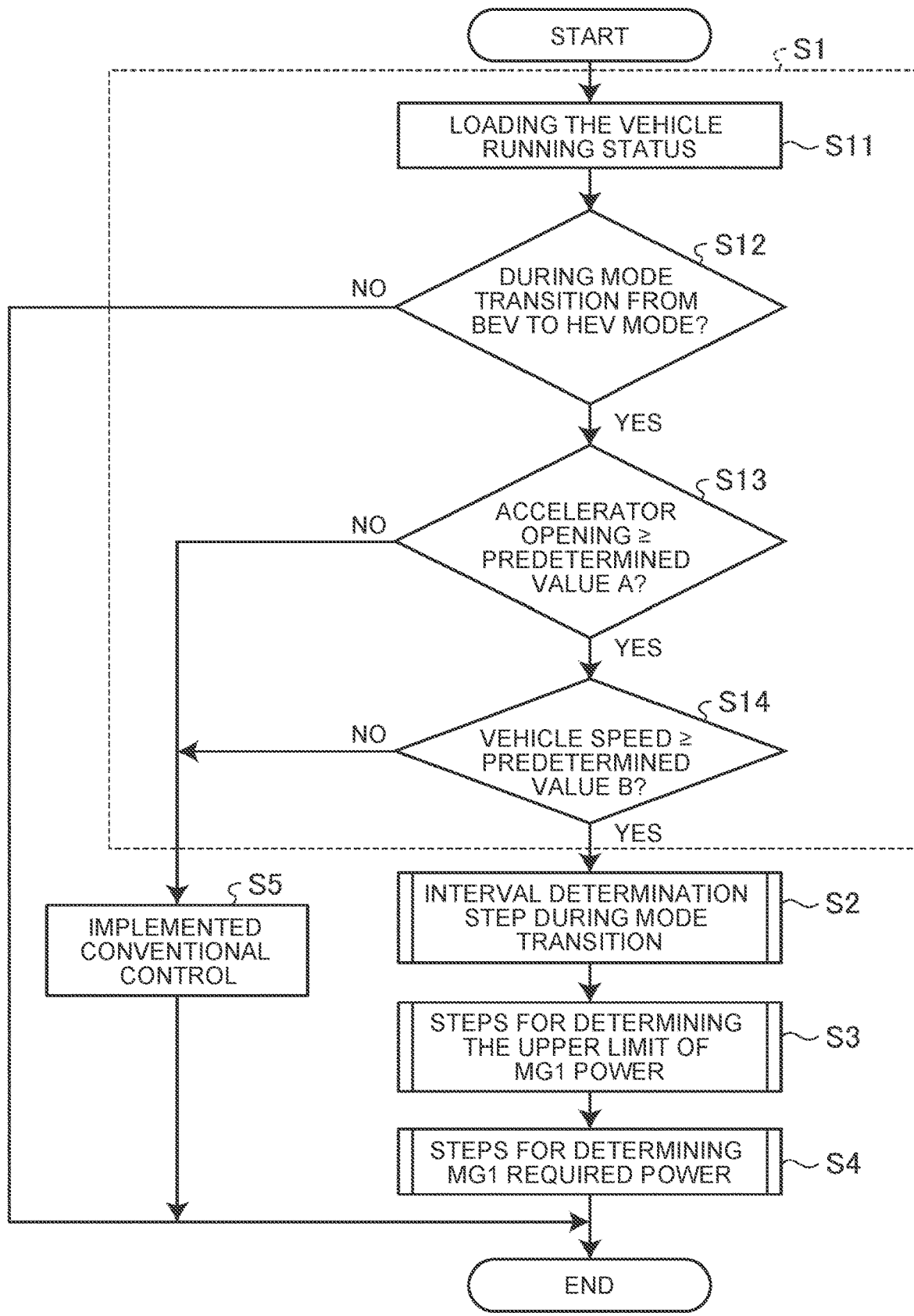
FIG. 8 is a flowchart illustrating an example of request output determination control of the first rotary electric machine performed by the control device in the vehicle according to the third embodiment.
Figure 9:
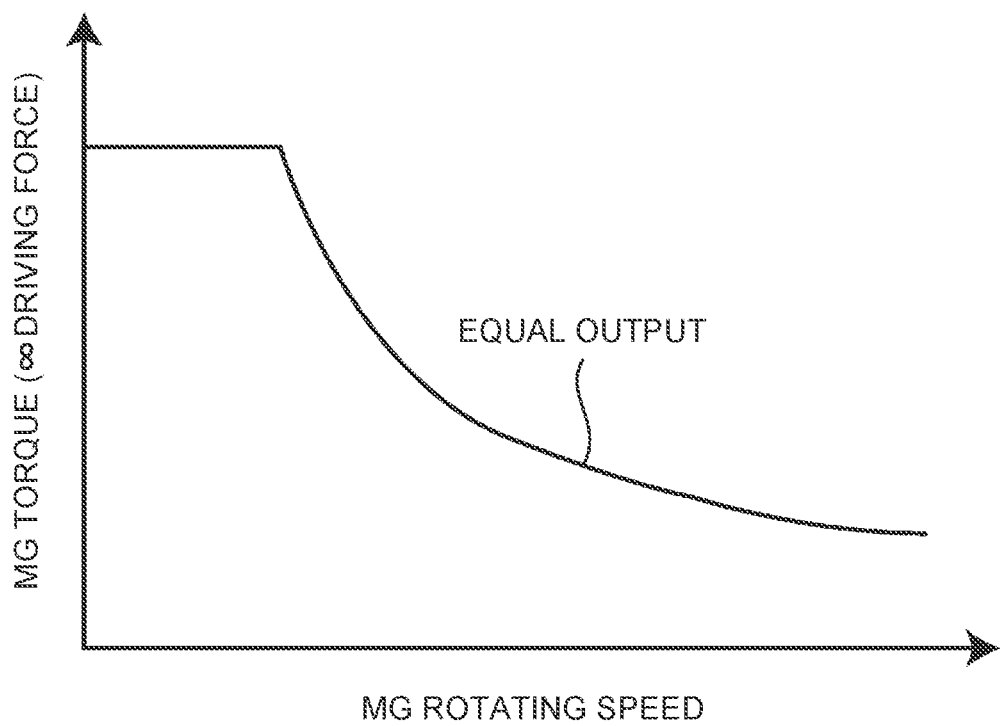
FIG. 9 is a diagram showing typical MG torques.

FIG. 8 is a flow chart illustrating an exemplary required-power determination control of the first rotary electric machine MG performed by the control device 30 in the vehicle 1 according to the third embodiment. In FIG. 8, S11 process, S12 process, S13 process, and S14 process are included in the control execution determination step (S1). FIG. 9 is a diagram illustrating a typical MG torque-characteristic.

First, the control device 30 reads the traveling condition of the vehicle (S11). Next, the control device 30 determines whether or not the mode transition from BEV mode to HEV mode is in progress (S12). When the control device 30 determines that the mode transition from BEV mode to HEV mode is not being performed (No in S12), the control device 30 ends the required-output determination control of the first rotary electric machine MG1.

On the other hand, when the control device 30 determines that the mode transition from BEV mode to HEV mode is being performed (Yes in S12), the control device determines whether or not the accelerator operation amount is equal to or greater than a predetermined value A (accelerator operation amount≥predetermined value A) (S13). When the control device 30 determines that the accelerator operation amount is less than the predetermined value A (accelerator operation amount<predetermined value A), the control device 30 performs the conventional control (S5). Thereafter, the control device 30 ends the series of required-output determination control of the first rotary electric machine MG1.

On the other hand, when the control device 30 determines that the accelerator operation amount is equal to or greater than the predetermined value A (Yes in S13), the control device 30 determines whether or not the present vehicle speed is equal to or greater than the predetermined value B (vehicle speed≥predetermined value B) (S14). The predetermined value B is, for example, a predetermined vehicle speed set in advance. Further, the vehicle speed may be determined based on the detected result of the vehicle speed sensor, MG rotational speed shown in FIG. 9 (e.g., rotational speed of the first rotary electric machine MG1) and MG torque (e.g., torque of the first rotary electric machine MG1) based on the relation, may be determined from the torque of the first rotary electric machine MG1 (MG torque), it may be determined from the rotational speed of the first rotary electric machine MG1. Further, the vehicle speed may be determined from the rotational speed (MG rotational speed) of the first rotary electric machine MG1 and the gear stage or gear ratio of the drive transmission system (transmission 4).

When the control device 30 determines that the present vehicle speed is equal to or greater than the predetermined value B (vehicle speed≥predetermined value B) (Yes in S14), the control device 30 performs the section determination steps during the mode-shifting (S2). Thereafter, the control device 30 terminates the request output determination control of the series of first rotary electric machine MG1 by executing the determination step of MG1 output upper limit (S3) and the determination step of MG1 request output (S4).

On the other hand, when the control device 30 determines that the present vehicle speed is less than the predetermined value B (vehicle speed<predetermined value B) (No in S14), the control device 30 performs the conventional control (S5). Thereafter, the control device 30 ends the series of required-output determination control of the first rotary electric machine MG1.

The control device 30 according to the embodiment can perform the present control in an area where the driving force compensation of the first rotary electric machine MG1 is small in the conventional control and the deviation between the required driving force and the driving force compensation of the first rotary electric machine MG1 is large.

Embodiment 4

A fourth embodiment of the vehicle control device according to the present disclosure will be described below. In the present embodiment, description similar to that of the first embodiment will be omitted as appropriate.

In the vehicle 1 according to the fourth embodiment, the present control is not always performed during the mode transition from BEV mode to HEV mode, but the present control is performed in a region where the driving force compensation of the first rotary electric machine MG1 is reduced in the conventional control and a region where the time required for the mode transition is long in the conventional control, and the conventional control is performed depending on a condition in which the conventional control is more favorable than the present control.

Figure 10:
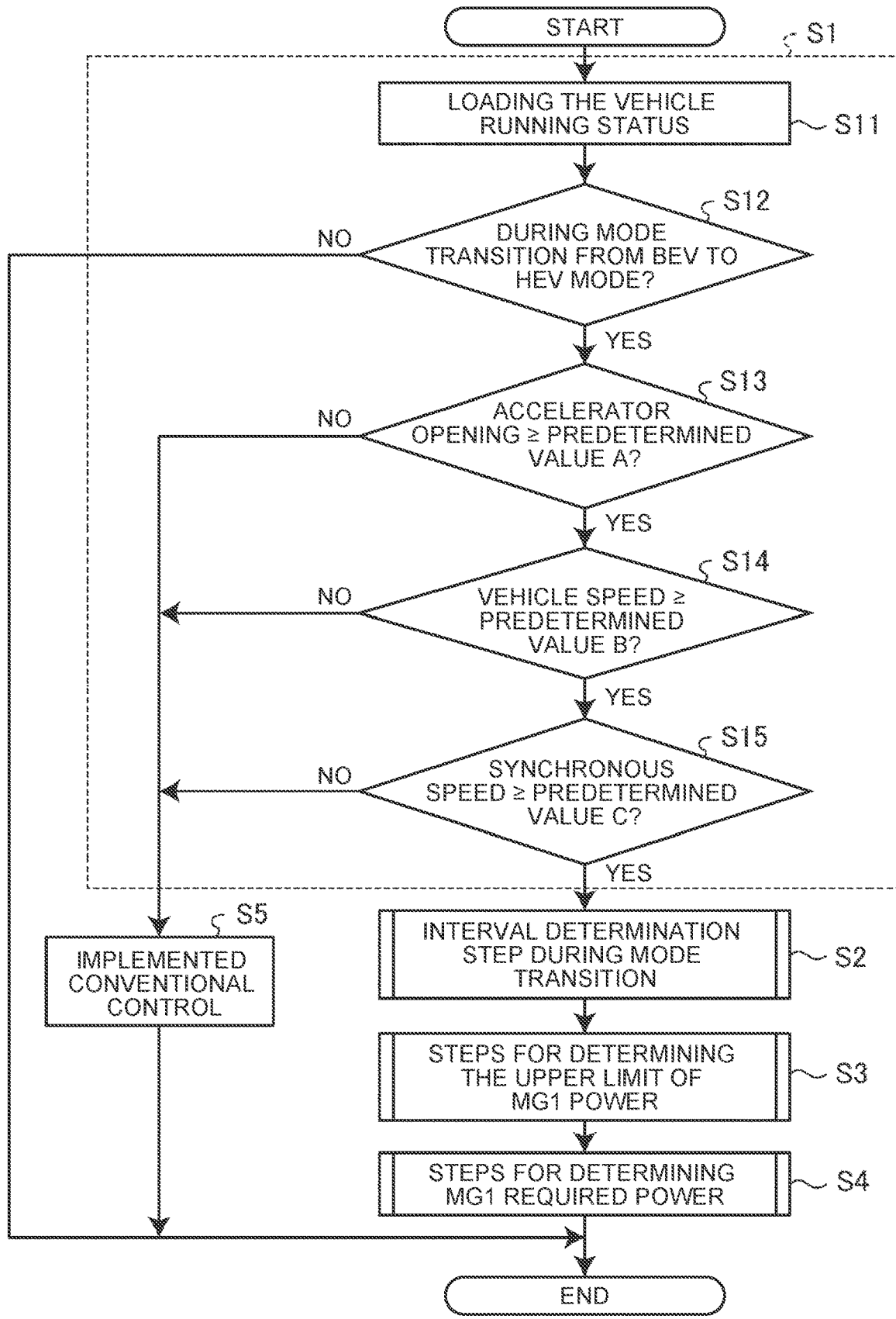
FIG. 10 is a flowchart illustrating an example of request output determination control of the first rotary electric machine performed by the control device in the vehicle according to the fourth embodiment.
Figure 11:
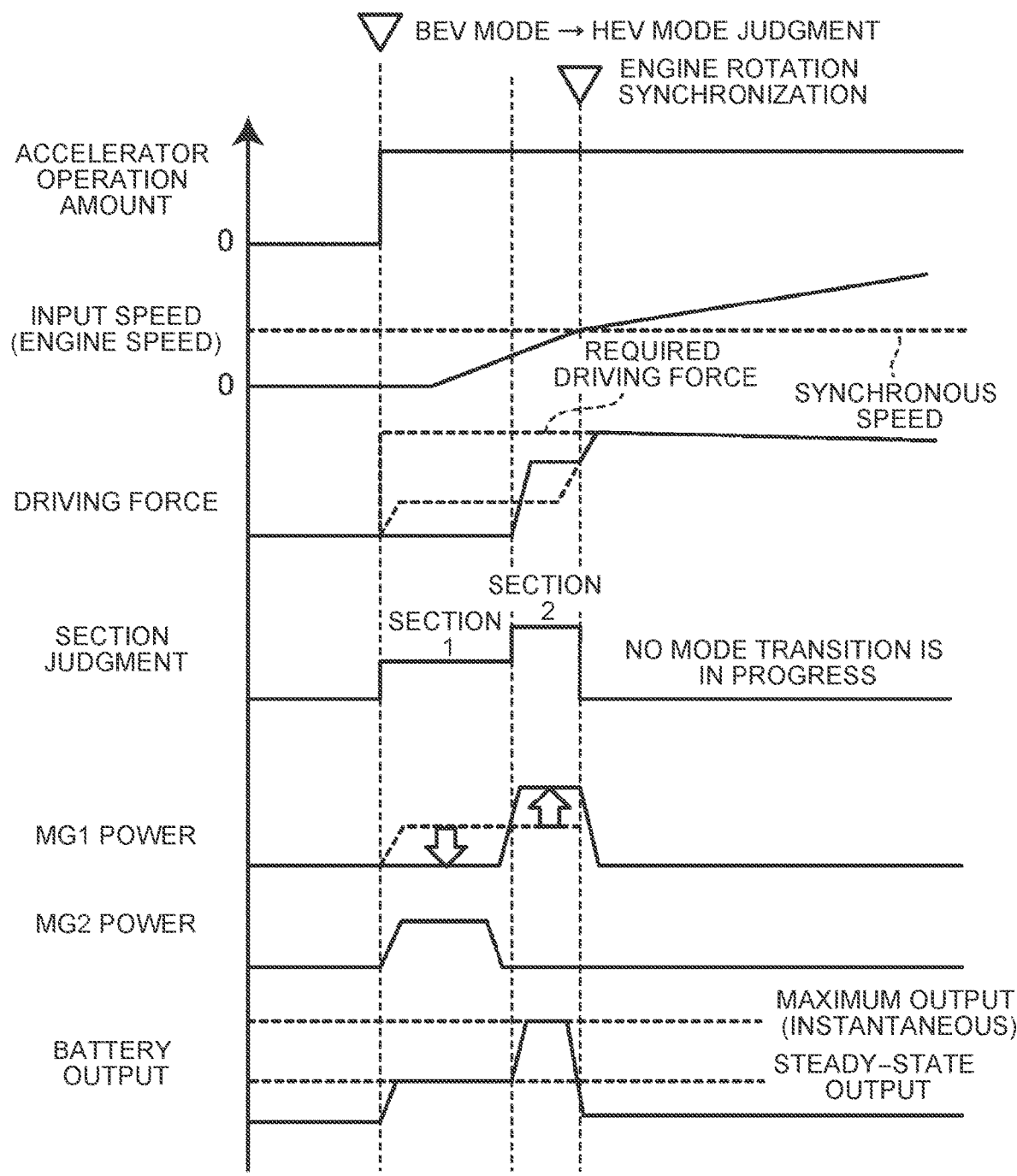
FIG. 11 is a diagram showing timing charts when switching from BEV mode to HEV mode in the vehicles according to the fourth embodiment.

FIG. 10 is a flow chart illustrating an exemplary required-power determination control of the first rotary electric machine MG1 performed by the control device 30 in the vehicle 1 according to the fourth embodiment. In FIG. 10, S11 process, S12 process, S13 process, S14 process, and S15 process are included in the control execution determination step (S1). FIG. 11 is a diagram illustrating a timing chart when switching from BEV mode to HEV mode in the vehicle 1 according to the fourth embodiment.

First, the control device 30 reads the traveling condition of the vehicle (S11). Next, the control device 30 determines whether or not the mode transition from BEV mode to HEV mode is in progress (S12). When the control device 30 determines that the mode transition from BEV mode to HEV mode is not being performed (No in S12), the control device 30 ends the required-output determination control of the first rotary electric machine MG1.

On the other hand, when the control device 30 determines that the mode transition from BEV mode to HEV mode is being performed (Yes in S12), the control device determines whether or not the accelerator opening degree is equal to or greater than a predetermined value A (accelerator opening degree≥predetermined value A) (S13). When the control device 30 determines that the accelerator opening degree is less than the predetermined value A (accelerator opening degree<predetermined value A), the control device 30 performs the conventional control (S5). Thereafter, the control device 30 ends the series of required-output determination control of the first rotary electric machine MG1.

On the other hand, when the control device 30 determines that the accelerator opening degree is equal to or greater than the predetermined value A (Yes in S13), the control device 30 determines whether or not the present vehicle speed is equal to or greater than the predetermined value B (vehicle speed≥predetermined value B) (S14). When the control device 30 determines that the present vehicle speed is less than the predetermined value B (vehicle speed<predetermined value B) (No in S14), the control device 30 performs the conventional control (S5). Thereafter, the control device 30 ends the series of required-output determination control of the first rotary electric machine MG1.

On the other hand, when the control device 30 determines that the present vehicle speed is equal to or greater than a predetermined value B (vehicle speed≥predetermined value B) (Yes in S14), the control device 30 determines whether the synchronous speed is equal to or greater than a predetermined value C (synchronous speed≥predetermined value C) (S15). The synchronous rotational speed may be determined from, for example, a gear stage or a gear ratio of the transmission 4. Further, the predetermined value C is, for example, a predetermined synchronous rotation speed set in advance.

When the control device 30 determines that the synchronous rotational speed is equal to or greater than a predetermined value C (synchronous rotational speed≥predetermined value C) (Yes in S15), the control device 30 performs the section determination steps during the mode-shifting (S2). Thereafter, the control device 30 terminates the request output determination control of the series of first rotary electric machine MG1 by executing the determination step of MG1 output upper limit (S3) and the determination step of MG1 request output (S4).

On the other hand, when the control device 30 determines that the synchronous rotational speed is less than the predetermined value C (synchronous rotational speed<predetermined value C) (No in S15), the control device 30 performs the conventional control (S5). Thereafter, the control device 30 ends the series of required-output determination control of the first rotary electric machine MG1.

In the vehicle 1 according to the fourth embodiment, as shown in FIG. 11, when the period of the section 2 is shortened under the condition that the time required for the mode transition is short, the conventional control can be performed when the effect of the driving force compensation in the present control is reduced.

Embodiment 5

A fifth embodiment of a vehicle control device according to the present disclosure will be described below. In the present embodiment, description similar to that of the first embodiment will be omitted as appropriate.

In the vehicle 1 according to the fifth embodiment, during the mode transition from BEV mode to HEV mode, control is performed to use up the steady-state power of the battery in the section 1.

Figure 12:
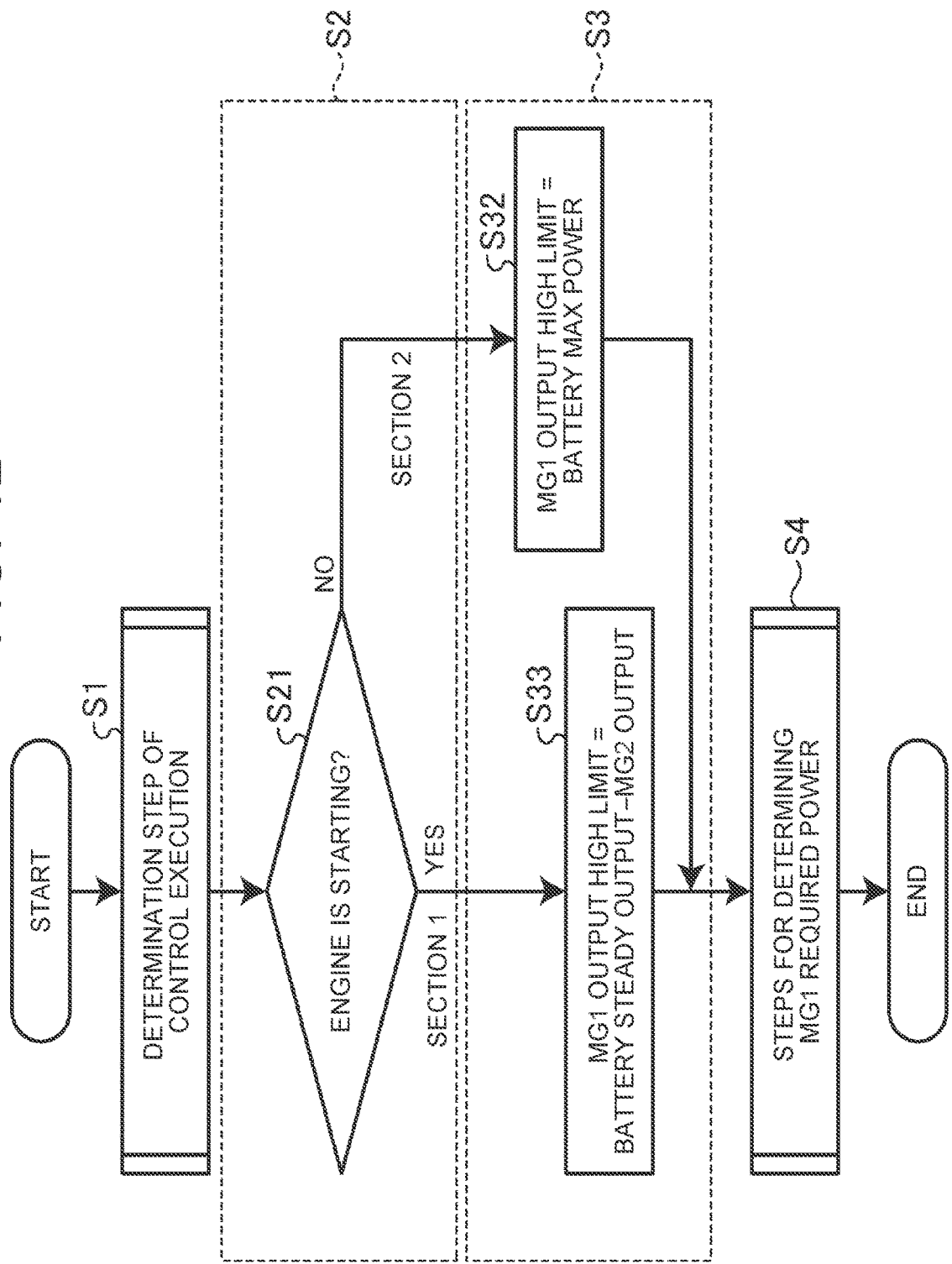
FIG. 12 is a flowchart illustrating an example of request output determination control of the first rotary electric machine performed by the control device in the vehicle according to the fifth embodiment.

FIG. 12 is a flow chart illustrating an exemplary required-power determination control of the first rotary electric machine MG1 performed by the control device 30 in the vehicle 1 according to the fifth embodiment. In FIG. 12, S21 process is included in the section determination step (S2) during the mode-shifting. Further, in FIG. 12, S32 process and S33 process are included in MG1 power upper limit determination step (S3).

First, the control device 30 performs control execution determination steps (S1). Next, the control device 30 determines whether or not the engine is starting (S21). When the control device 30 determines that the engine is starting (Yes in S21), the control device 30 determines that the section during the mode transition is the section 1 and the output upper limit of the first rotary electric machine MG1 satisfies the relation of "MG1 output upper limit=battery steady output—MG2 output" (S33). The control device 30 then S4 the steps of determining MG1 required power. Thereafter, the control device 30 ends the series of required-output determination control of the first rotary electric machine MG1.

On the other hand, when the control device 30 determines in S21 that the engine is not being started (No in S21), the control device 30 determines that the section during the mode-shifting is the section 2 and the output upper limit of the first rotary electric machine MG1 satisfies the relation of "MG1 output upper limit=battery maximum output" (S32). The control device 30 then S4 the steps of determining MG1 required power. Thereafter, the control device 30 ends the series of required-output determination control of the first rotary electric machine MG1.

In the vehicle 1 according to the fifth embodiment, the steady output of the battery can be exhausted in the section 1, and the driving force compensated by the first rotary electric machine MG1 can be more effectively compensated than when the steady output of the battery remains in the section 1.

Embodiment 6

A sixth embodiment of the vehicle control device according to the present disclosure will be described below. In the present embodiment, description similar to that of the first embodiment will be omitted as appropriate.

In the vehicle 1 according to the sixth embodiment, during the mode transition from BEV mode to HEV mode, control is performed so that the maximum power of the battery is exhausted to the allowable period during the start-up of the engine.

Figure 13:
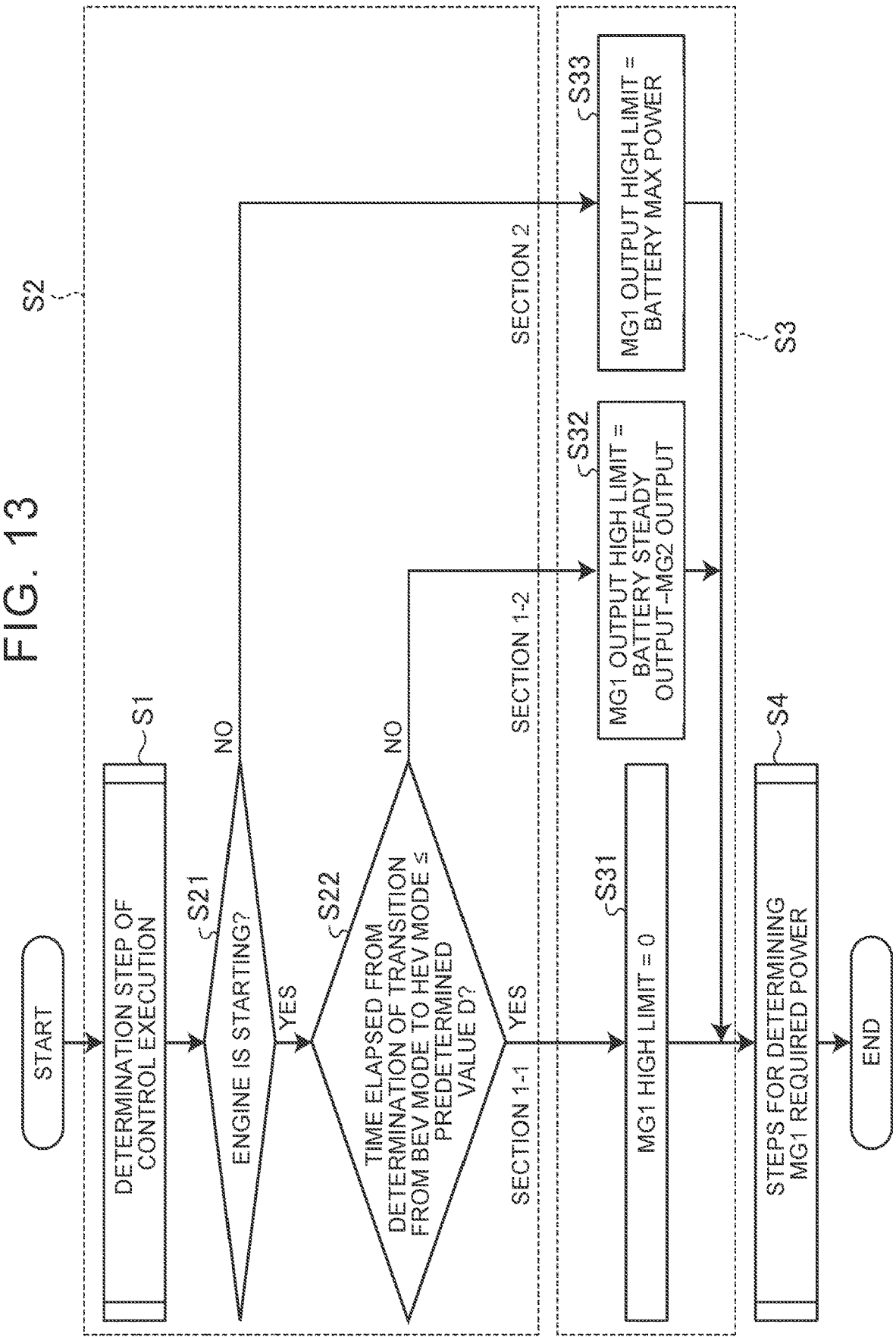
FIG. 13 is a flowchart illustrating an example of request output determination control of the first rotary electric machine performed by the control device in the vehicle according to the sixth embodiment.

FIG. 13 is a flow chart illustrating an exemplary required-power determination control of the first rotary electric machine MG1 performed by the control device 30 in the vehicle 1 according to the sixth embodiment. In FIG. 13, S21 process and S21 process are included in the section determination step (S2) during the mode-shifting. Further, in FIG. 13, S31 process, S32 process, and S33 process are included in MG1 power upper limit determination step (S3).

Figure 14:
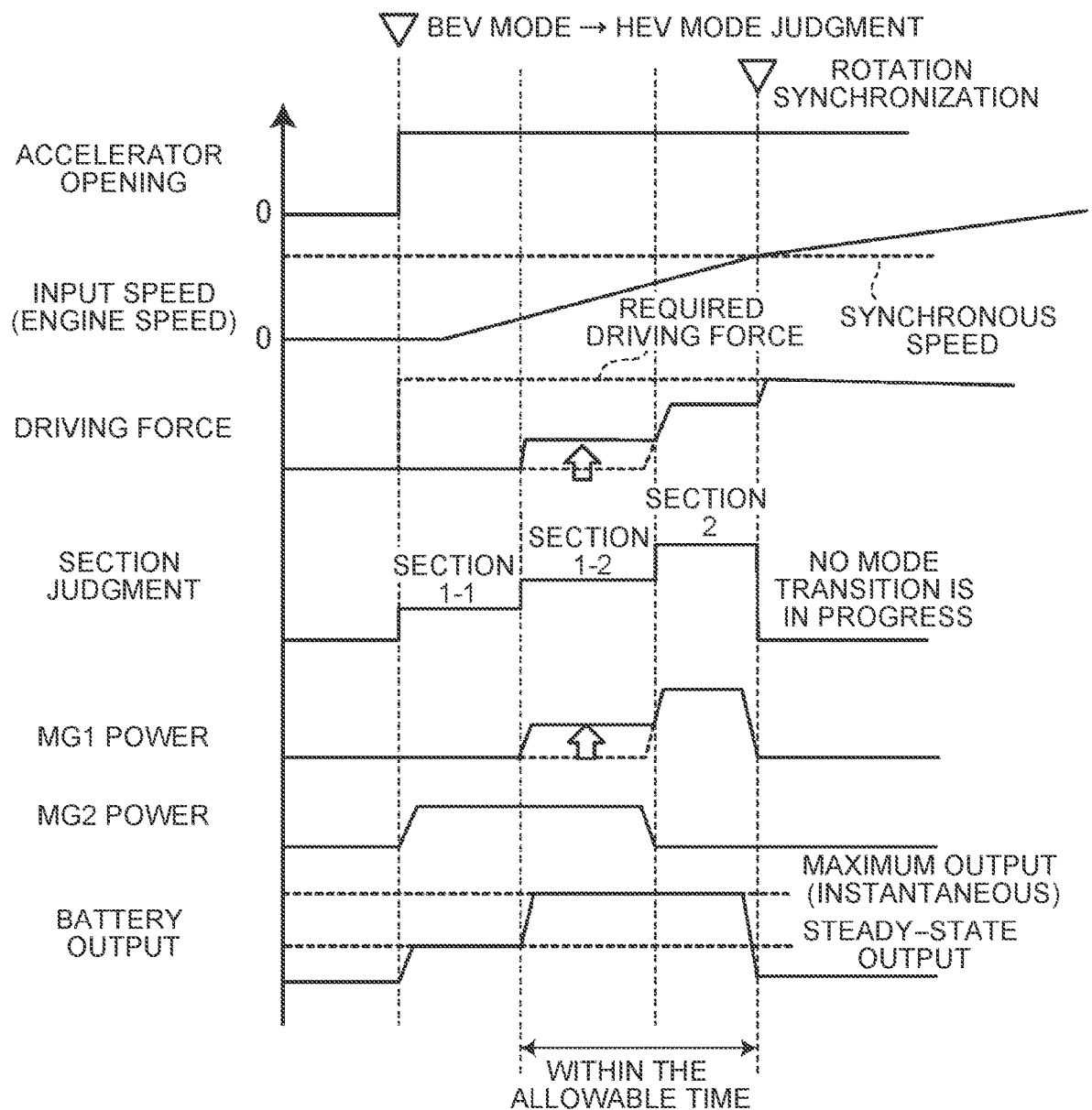
FIG. 14 is a diagram showing timing charts when switching from BEV mode to HEV mode in the vehicles according to the sixth embodiment.

FIG. 14 is a diagram illustrating a timing chart when switching from BEV mode to HEV mode in the vehicle 1 according to the sixth embodiment.

First, the control device 30 performs control execution determination steps (S1). Next, the control device 30 determines whether or not the engine is starting (S21). When the control device 30 determines that the engine is being started (Yes in S21), it determines whether or not the elapsed time from the determination of the transition from BEV mode to HEV mode is equal to or less than a predetermined value D (the elapsed time≤the predetermined value D) (S22). As the determination value of the elapsed time, for example, it is desirable that the rotation speed (rotation shaft 22) of the engine 2 is determined in accordance with the synchronous rotation speed at the time of engine rotation synchronization synchronized with the rotation speed of the output shaft (rotation shaft 23) of the transmission 4. This is because it is desirable to set the determination value in accordance with the time required for the mode transition because the time required for the mode transition becomes longer as the synchronous rotational speed increases. The predetermined value D is, for example, a predetermined time set in advance.

When the control device 30 determines that the elapsed time is equal to or less than the predetermined value D (the elapsed time≤the predetermined value D) (Yes in S22), the control device 30 determines the output upper limit of the first rotary electric machine MG1 as the section 1-1 in which the section during the mode-transition is the first half of the section 1 so as to satisfy the relation of "MG1 output upper limit=0" (S31). The control device 30 then S4 the steps of determining MG1 required power. Thereafter, the control device 30 ends the series of required-output determination control of the first rotary electric machine MG1.

On the other hand, in S22, when the control device 30 determines that the elapsed time is longer than the predetermined value D (the elapsed time≥the predetermined value D) (No in S22), the control device 30 determines the output upper limit of the first rotary electric machine MG1 to satisfy the relation of "MG1 output upper limit=battery steady output—MG2 output" as the section 1-2 in which the section during the mode-transition is the second half of the section 1 (S33). The control device 30 then S4 the steps of determining MG1 required power. Thereafter, the control device 30 ends the series of required-output determination control of the first rotary electric machine MG1.

Further, when the control device 30 determines in S21 that the engine is not being started (No in S21), the control device 30 determines that the section during the mode-shifting is the section 2 and the output upper limit of the first rotary electric machine MG1 satisfies the relation of "MG1 output upper limit=battery maximum output" (S32). The control device 30 then S4 the steps of determining MG1 required power. Thereafter, the control device 30 ends the series of required-output determination control of the first rotary electric machine MG1.

In the vehicle 1 according to the sixth embodiment, during the mode transition from BEV mode to HEV mode, the maximum power of the battery is exhausted to the allowable period during the start-up of the engine, so that the driving force compensated by the first rotary electric machine MG1 can be maximally utilized.

Embodiment 7

A seventh embodiment of a vehicle control device according to the present disclosure will be described below. In the present embodiment, description similar to that of the first embodiment will be omitted as appropriate.

In the vehicle 1 according to the seventh embodiment, the control for determining the output of the first rotary electric machine MG1 with respect to the driving force demand is performed within MG1 output upper limit determined in S3 of MG1 output upper limit.

Figure 15:
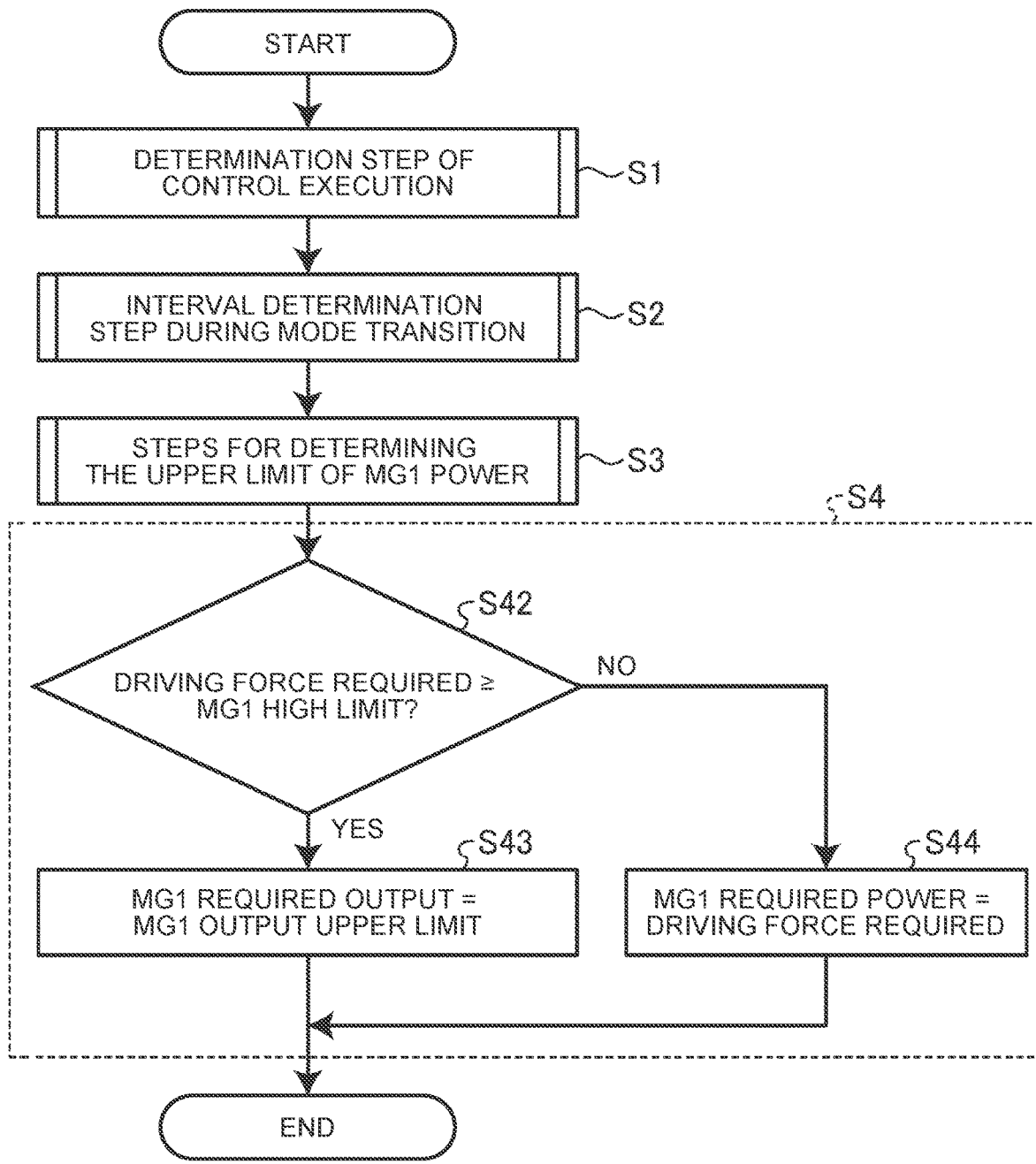
FIG. 15 is a flowchart illustrating an example of request output determination control of the first rotary electric machine performed by the control device in the vehicle according to the seventh embodiment.

FIG. 15 is a flow chart illustrating an exemplary required-power determination control of the first rotary electric machine MG1 performed by the control device 30 in the vehicle 1 according to the seventh embodiment. In FIG. 15, S42 process, S43 process, and S44 process are included in MG1 request-output determination step (S4).

First, the control device 30 executes determination steps of control execution (S1). Next, the control device 30 executes the section determination step during the mode-shifting (S2). Next, the control device 30 performs MG1 power upper limit determination steps (S3).

Next, the control device 30 determines whether or not the driving force request is equal to or greater than the output upper limit of the first rotary electric machine MG1 (driving force request≥MG1 output upper limit) (S42). When the control device 30 determines that the drive force request is equal to or greater than the output upper limit of the first rotary electric machine MG1 (drive force request≥MG1 output upper limit) (Yes in S42), the control device 30 determines the required output of the first rotary electric machine MG1 to be the output upper limit of the first rotary electric machine MG1 (MG1 required output=MG1 output upper limit) (S43). Thereafter, the control device 30 ends the series of required-output determination control of the first rotary electric machine MG1.

On the other hand, when the control device 30 determines that the driving force request is less than the output upper limit of the first rotary electric machine MG1 (driving force request<MG1 output upper limit) (No in S42), the control device 30 determines the required output of the first rotary electric machine MG1 as the driving force request (MG1 required output=driving force request) (S44). Thereafter, the control device ends the series of required-output determination control of the first rotary electric machine MG1.

In the vehicle 1 according to the seventh embodiment, it is possible to determine an appropriate required output of the first rotary electric machine MG1 within MG1 output upper limit and compensate the driving force by the first rotary electric machine MG1. It should be noted that the output upper limit of the first rotary electric machine MG1 may be subtracted by the power when the battery power is required to be supplied to other than the first rotary electric machine MG1 and the second rotary electric machine MG2.

What is claimed is:

1. A vehicle control device mounted on a vehicle including:
    an engine;
    a clutch provided on a power transmission path between the engine and a drive wheel;
    a first rotary electric machine connected to the drive wheel;
    a second rotary electric machine connected to the engine; and
    a power storage device for supplying electric power to the first rotary electric machine and the second rotary electric machine,
    the vehicle further including a first traveling mode in which the vehicle travels using torque output from the first rotary electric machine driven by electric power from the power storage device, in a state in which the clutch is released and the engine is stopped, and
    a second traveling mode in which the engine is operated with the clutch engaged and the vehicle travels using torque output from the engine and the torque output from the first rotary electric machine driven by electric power from the power storage device, wherein
    a first section and a second section are included in a period until a clutch engagement at a time of starting the engine when shifting from the first traveling mode to the second traveling mode, the first section being a section for cranking the engine by an output of the second rotary electric machine, and the second section being a section after the first section and a section for assisting a driving force of the engine by an output of the first rotary electric machine, and
    the vehicle control device performs control for limiting an increase in the torque of the first rotary electric machine in the first section.

2. The vehicle control device according to claim 1, wherein the vehicle control device performs control in which an output upper limit of the first rotary electric machine is determined to be zero in a first half portion of the first section and in which the output upper limit of the first rotary electric machine is determined to be a value obtained by subtracting an output of the second rotary electric machine from a steady output of the power storage device in a second half portion of the first section, when an elapsed time from a determination of a shift from the first traveling mode to the second traveling mode is equal to or less than a predetermined time set in advance.

3. The vehicle control device according to claim 1, wherein the vehicle control device performs control such that a total of a required output of the first rotary electric machine and a required output of the second rotary electric machine becomes a maximum output of the power storage device in the first section, when an accelerator operation amount is smaller than a predetermined accelerator operation amount set in advance, when a vehicle speed is lower than a predetermined vehicle speed set in advance, or when a synchronous rotation speed at a time of clutch connection is lower than a predetermined synchronous rotation speed set in advance.

4. The vehicle control device according to claim 1, wherein the first section is a period until an engine speed becomes equal to or higher than a predetermined speed.

* * * * *